(12) United States Patent
Burgers et al.

(10) Patent No.: US 11,349,164 B2
(45) Date of Patent: May 31, 2022

(54) BATTERY COOLER SUPPORT ARCHITECTURE

(71) Applicant: DANA CANADA CORPORATION, Oakville (CA)

(72) Inventors: John Burgers, Oakville (CA); Noman Rahim, Brampton (CA)

(73) Assignee: DANA CANADA CORPORATION, Oakville (CA)

( * ) Notice: Subject to any disclaimer, the term of this patent is extended or adjusted under 35 U.S.C. 154(b) by 62 days.

(21) Appl. No.: 16/470,701

(22) PCT Filed: Dec. 19, 2017

(86) PCT No.: PCT/CA2017/051540
§ 371 (c)(1),
(2) Date: Jun. 18, 2019

(87) PCT Pub. No.: WO2018/112619
PCT Pub. Date: Jun. 28, 2018

(65) Prior Publication Data
US 2020/0091571 A1    Mar. 19, 2020

Related U.S. Application Data

(60) Provisional application No. 62/436,144, filed on Dec. 19, 2016.

(51) Int. Cl.
*H01M 10/6556* (2014.01)
*H01M 10/613* (2014.01)
(Continued)

(52) U.S. Cl.
CPC ......... *H01M 10/6556* (2015.04); *F28F 3/025* (2013.01); *H01M 10/613* (2015.04);
(Continued)

(58) Field of Classification Search
CPC .. F28F 3/025; H01M 10/6556; H01M 10/613; H01M 10/65; H01M 10/6551; H01M 10/6554
See application file for complete search history.

(56) References Cited

U.S. PATENT DOCUMENTS 9,052,148 B2   6/2015  Eckstein et al.
9,530,994 B2   12/2016 Pierre et al.
(Continued)

FOREIGN PATENT DOCUMENTS

WO    2017070785 A1    5/2017

OTHER PUBLICATIONS

ISA Canadian Intellectual Property Office, International Search Report Issued in Application No. PCT/CA2017/051540, dated Mar. 26, 2018, WIPO, 3 pages.
(Continued)

*Primary Examiner* — Matthew T Martin
*Assistant Examiner* — Jessie L. Walls
(74) *Attorney, Agent, or Firm* — McCoy Russell LLP

(57) ABSTRACT

A battery cooler assembly having a frame with a pair of opposed parallel walls, with each wall having a ledge extending outwardly from the wall. A heat exchanger positioned between the walls, and having a plate pair together defining a fluid flow channel permitting fluid flow from an inlet to an outlet on the heat exchanger. One or more battery modules positioned on the heat exchanger. A plurality of support structures engage the heat exchanger and positioned between the walls; and extend from a first edge to a second end of the heat exchanger, where the first edge is proximate to one of the walls and the second edge is proximate to the other wall. The plurality of support structures engaging the one or more battery modules reducing stress on the heat exchanger.

12 Claims, 9 Drawing Sheets

(51) Int. Cl.
*H01M 10/6554* (2014.01)
*F28F 3/02* (2006.01)
*H01M 50/20* (2021.01)
*H01M 10/65* (2014.01)
*H01M 10/625* (2014.01)
*H01M 10/6551* (2014.01)

(52) U.S. Cl.
CPC ......... *H01M 10/625* (2015.04); *H01M 10/65* (2015.04); *H01M 10/6551* (2015.04); *H01M 10/6554* (2015.04); *H01M 50/20* (2021.01); *H01M 2220/20* (2013.01)

(56) References Cited

U.S. PATENT DOCUMENTS

| | | | | |
|---|---|---|---|---|
| 2011/0183179 A1* | 7/2011 | Okada | ................... | H01M 50/20 |
| | | | | 429/120 |
| 2013/0309545 A1 | 11/2013 | Daubitzer et al. | | |
| 2014/0087231 A1* | 3/2014 | Schaefer | ............... | H01M 50/24 |
| | | | | 429/120 |
| 2015/0249238 A1* | 9/2015 | Andre | ................. | H01M 10/613 |
| | | | | 429/99 |
| 2016/0164148 A1* | 6/2016 | Yum | ................... | H01M 10/613 |
| | | | | 429/120 |
| 2016/0276718 A1 | 9/2016 | Prevost et al. | | |
| 2016/0297320 A1* | 10/2016 | Legot | ....................... | B60K 1/04 |
| 2017/0018824 A1* | 1/2017 | Maguire | ........... | H01M 10/6554 |

OTHER PUBLICATIONS

China National Intellectual Property Administration, Office Action and Search Report Issued in Application No. 201780078285.2, dated Sep. 8, 2021, 13 pages.

\* cited by examiner

Min. TIM Compression: 0.249mm
Max. TIM Compression: 0.320mm

BATTERY COOLER SUPPORT ARCHITECTURE

CROSS-REFERENCE TO RELATED APPLICATIONS

This application claims the benefit of and priority to US Provisional Patent Application No. U.S. 62/436,144, filed Dec. 19, 2016, under the title BATTERY COOLER SUPPORT ARCHITECTURE. The content of the above patent application is hereby expressly incorporated by reference into the detailed description hereof.

FIELD

The specification relates to a cooler assembly having a battery cooler and a support architecture.

BACKGROUND

Automotive passenger cars powered by electric energy produced from renewable energy hold promise to reduce global warming. Electric batteries based on lithium-ion battery electro-chemistry are the preferred on-board energy storage device for passenger vehicles. Vehicle life time durability of lithium batteries depends heavily on keeping the battery between 5° C. and 40° C. both when idle and when in operation. Battery cell temperature is influenced by the temperature of their environment and by self heating during operation. Heating from operation is dependant on the internal electrical resistance ($R_e$) and electrical current (I), which the battery is delivering to propel the vehicle. Battery life is a key measure by which original equipment manufacturer's (OEM's) defines vehicle warranty. Battery life is defined as the warranty period in years for which the battery retains 80% of its rated energy storage capability. When hot battery life is reduced because unwanted chemical reactions, commonly referred to as side reactions, act to degrade electro chemistry function. When cold battery life is reduced because lithium ions come out of solution in the electrolyte and form a dendritic structure of metallic lithium. Since the quantity of lithium in the electrolyte is a measure of battery storage capacity, its loss translates to reduced life. In severe circumstances the growing lithium dendrites can puncture the battery membrane thereby causing an electrical short circuit with total loss of battery function.

There is motivation to manage battery electro-chemistry temperature both when the vehicle is in service and when idle. Lithium ion batteries are constructed in battery cells. Each cell consists of a layered structure of electrical conductors, electro-chemistry and ion-membranes. This layered structure is packaged in a container forming a hermetic seal with the atmosphere which is essential to prolonged life. Regulating the electro-chemistry temperature inside the layered and packaged structure of battery cells requires the management of heat flow both into and from the cell.

To ensure a warranty free useful life of batteries for electrified vehicles, a means of getting heat into and out of the battery cells is a requirement in the battery architecture. To achieve 8 year battery warranty life, defined as the period during which the battery retains 80% of its rated energy storage capacity, limits are placed on the temperature and on the temperature uniformity within each cell and for the aggregate of all cells inside the battery. Typical limits are that the entire battery and each cell must remain in the operating range of (5-35° C.), while at the same time the temperature range inside each individual cell must remain within 2° C. and for the composite of cells within 5° C.

The very low level of temperature uniformity of both the individual cells (2° C.) and the composite of cells (5° C.) requires that the thermal system be in intimate physical contact with the exterior surface of each cell. Thermal systems which contact a larger portion of the cell exterior result in lower levels of temperature variation, which is desirable. Intimate physical contact of the thermal system to each individual cell in a vehicle battery is challenged by the dimensional variation of the components and functional limits of the battery physical architecture.

The voltage of automotive batteries can range from 360 to 460 Volts which is unsafe to human touch. To improve safety in automotive battery assembly, cells are grouped into modules each below the safety limit of 60 Volts. Each module may consist of from 15 to 25 battery cells. The automotive battery architecture is based on packaging a number of modules (usually 6 to 18 modules or more), depending on the battery energy capacity required.

Vehicle manufacturers have standardized the physical shape and size of battery cells. Modules (4) produced from these cells are also very similar in physical dimensions and in structure. A typical cell (2) structure is shown as FIG. 1. Similarly a typical module (4) structure is shown in FIG. 2.

The module (4) contains cells (2), held together by heavy end frames and tall slender side walls. This module frame (6) structure is necessary to support all the cells during vehicle operation, which involves forces exerted by shock, vibration, thermal, acceleration, and mechanical loads. The module (4) is made "stiff" to deflection from these forces to keep the bottom surfaces of the cells in alignment, so as to present at contact surface to a battery cooling device as part of the battery architecture shown in FIG. 3.

Looking more closely (FIG. 4), corner bolts in the stiff end frames fix the module onto support rails. The support rails are instrumental to the battery enclosure structural strength, which ensure safety in vehicle use and protection in misuse. In this way, module suppliers provide a safe battery cell, packaged in a stiff module that ensures a battery architecture that is simple, safe and modular.

When mounted in the battery architecture (FIG. 4), each module (4) (FIG. 2), presents one surface of each cell in alignment with all the other cells, so that a battery cooler (108) (FIG. 5), can be preplaced in the battery architecture (FIG. 6), adjacent to the module so that the cooler contacts each cell. Small deviations in alignment of individual cells and small variations in cooler surface flatness are accommodated by placing a mechanically compliant material capable of conducting heat between the cells and cooler. By compressing this compliant thermal interface material (TIM) (not shown), it will comply to these surface irregularities so that the entire of cell bottom surface area (s) comes in thermal contact with the cooler.

Typical coolers are in the range of from 1 to 10 mm thick. Modules are typically 100 mm to 200 mm wide, 100 mm to 200 mm tall, and range from 300 mm to over 1600 mm in length. Being much thinner than the module, typically only 1 to 5 percent of the module height, the module can be considered a rigid body in comparison to the cooler. Depending on the TIM material stiffness an interface pressure sufficient to accommodate 1 mm of relative surface irregularity can range from 0.2 MPa to 2 MPa.

Desirably, the cooler with its mounting structure generates a uniform TIM compression pressure, to squeeze the TIM into gaps caused by surface irregularities of the cooler and adjacent surfaces of the contacting cells. To fulfill this, the cooler and its mounting system must have sufficient mechanical flexure strength to limit deflections of the cooler surface to much less than the 0.2 mm to 1 mm contact gaps caused by the surface irregularities. Typically the cooler surface flexural deflections caused by TIM pressure loading should fall below 100 microns, see FIG. 8.

Weight savings of electric vehicles has a higher relative impact on vehicle driving range than for fossil fuel vehicles simply because of the reduced amount of total energy stored in an electric battery compared to a fossil fuel tank. This means that electric vehicles place a higher consumer value on weight savings. This desire impacts battery cooler design choices in that a typical vehicle might save in the range of 3 to 7 kg of weight by minimizing the mass of the cooler and its supporting structure. This drives design choices of the cooler and its supporting structure.

There is a need in the art for a battery cooler support architecture that can help prevent or reduce battery cooler bending. In addition, there is a need in the art for a battery cooler support structure that can provide support to the battery cooler. Further, there is a need in the art for a battery cooler support architecture that adds minimal weight to the support architecture, while providing support to the battery cooler and/or help prevent battery cooler bending.

SUMMARY OF INVENTION

In one aspect, the specification relates to a battery cooler assembly, having:

a frame having a pair of opposed parallel walls, each of the walls having a ledge extending outwardly from one of the walls towards the other wall;

a heat exchanger positioned between the opposed parallel walls, the heat exchanger having a plate pair, the plate pair having a first plate and a second plate coupled to one another, the first plate and the second plate together defining a fluid flow channel permitting fluid flow from an inlet on the heat exchanger to an outlet on the heat exchanger; and a plurality of support structures engaging the heat exchanger and positioned between the opposed parallel walls, and extending from a first edge of the heat exchanger to a second end of the heat exchanger, wherein the first edge of the heat exchanger is proximate to one of the opposed parallel walls and the second edge of the heat exchanger is proximate to the other opposed parallel wall; the plurality of support structures engaging the one or more battery modules reducing stress on the heat exchanger.

DESCRIPTION OF FIGURES

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Retaining thermal contact over the entirety of cooler and adjacent cell surface areas under the loading conditions generated during cooler and module assembly leads to a support structure for the cooler, as disclosed herein.

Figure 8:
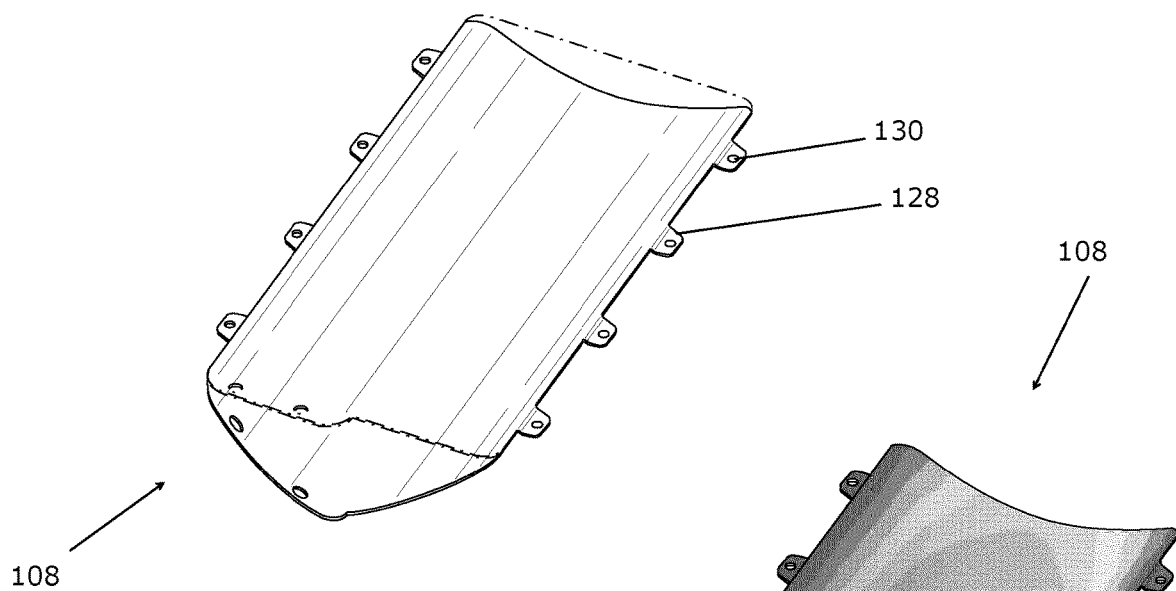
FIG. 8 shows a sketch of the deflection of an unsupported battery cooler.
Figure 9:
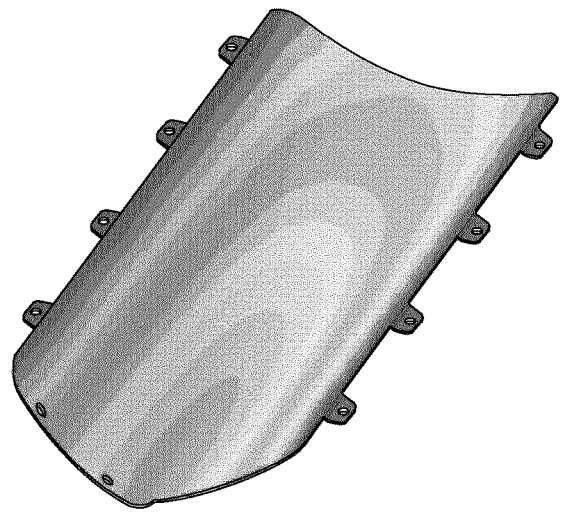
FIG. 9 shows the deflection of an unsupported battery cooler.

To properly cool a battery to the achieve small temperature variation of the battery electro-chemistry, typically 2° C. to 5° C., a relatively thin battery cooler ranging from 1 mm to 5 mm in total thickness is sufficient. Such thin coolers deflect more than the desired limit of 100 microns under the desired 0.2 to 2 MPa range of TIM compression pressure over the 200 mm to 500 mm mounting spans available for typical battery modules (see FIGS. 8 and 9). An additional flexural member is required to support the cooler where it deflects. This support structure would be supported by and span between the rails onto which the modules are mounted. In this way the support structure would generate a uniform pressure on the cooler forcing it in contact to the module.

Two variations of such a structure are disclosed. The first (FIGS. 10 & 11) connects the cooler to the frame of the module to utilize existing material so that the total weigh savings is greater. The second (FIGS. 12-15 & 20-22) adds a beam structure beneath the cooler which spans between the module mounting rails. A combination of this beam structure connected to the module side rails is a natural combination of these effects.

Figure 10:
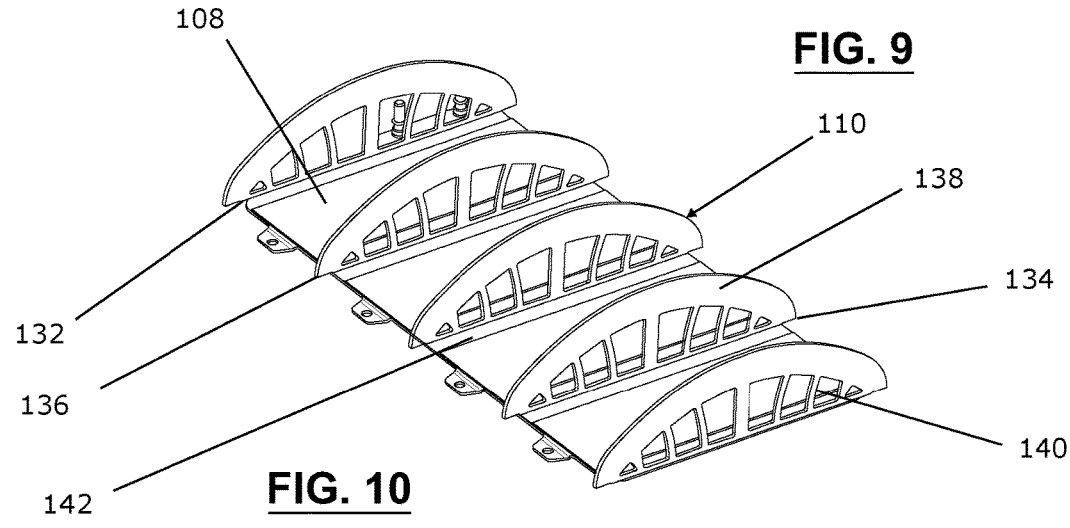
FIG. 10 shows a perspective view of a first embodiment of a battery cooler support architecture in accordance with the specification.
Figure 11:
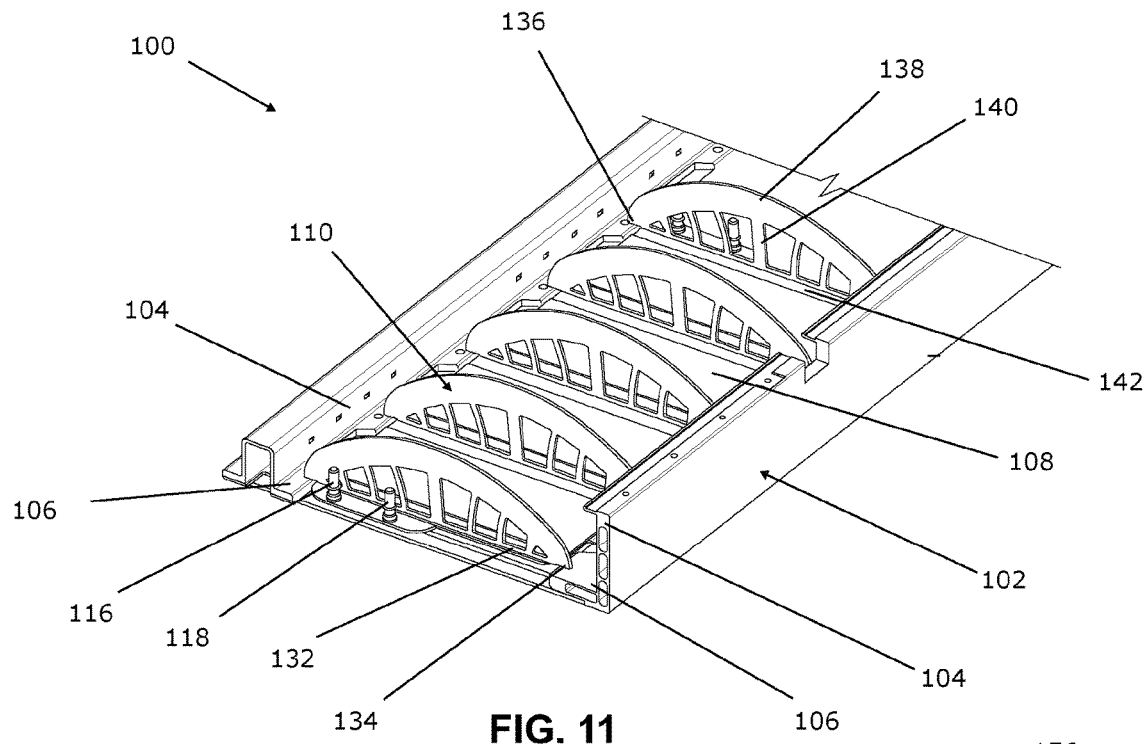
FIG. 11 shows another perspective view of the first embodiment of a battery cooler support architecture in accordance with the specification.
Figure 12:
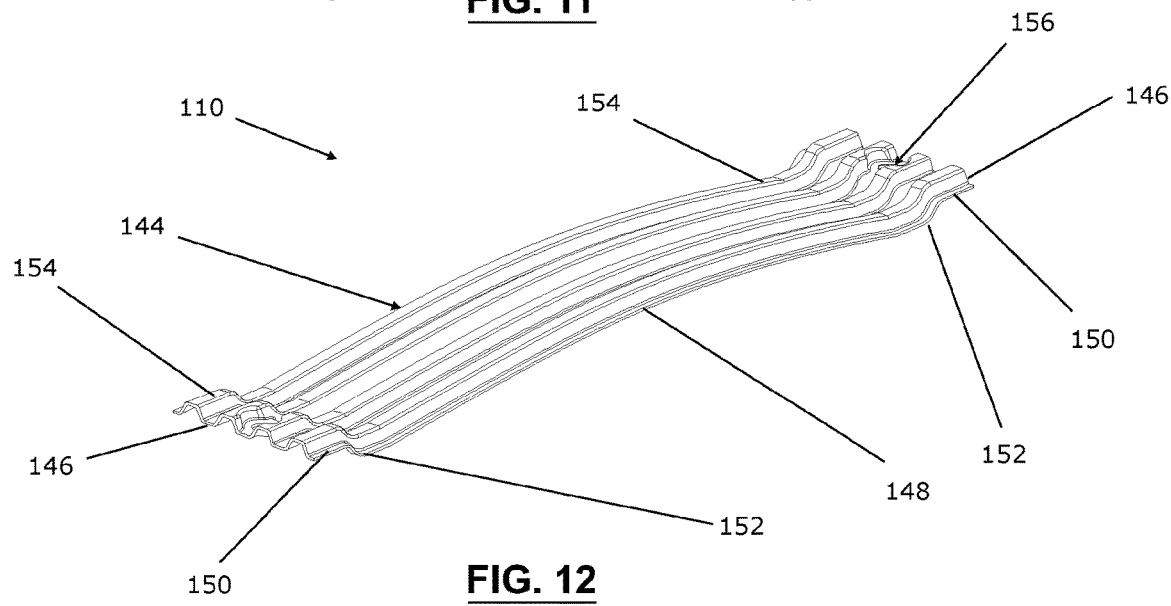
FIG. 12 shows a perspective view of a support beam for use in a battery cooler support architecture in accordance with a second embodiment of the specification.
Figure 13:
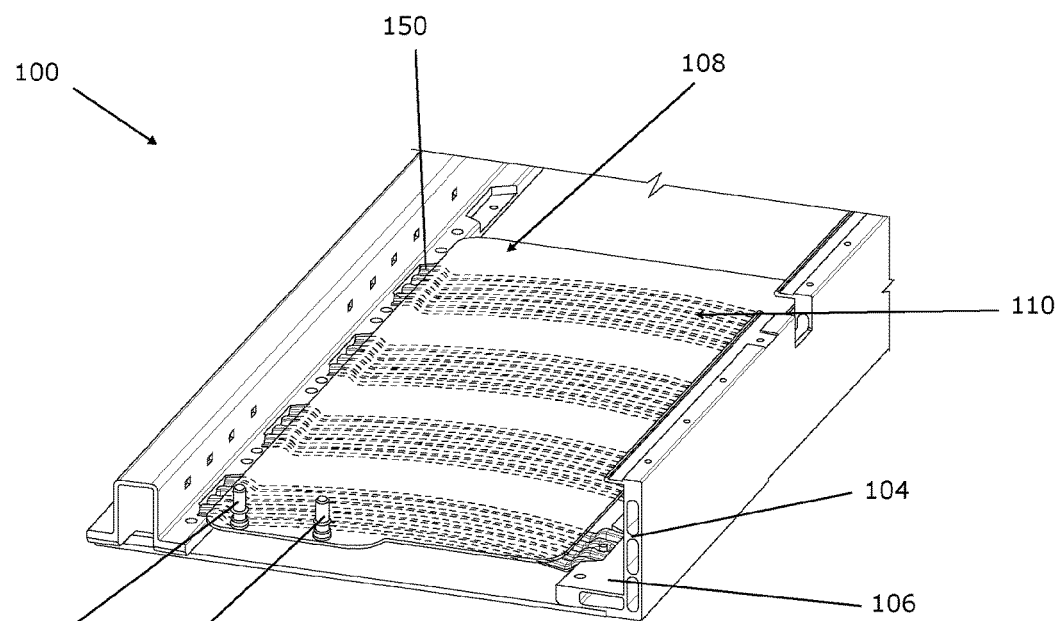
FIG. 13 shows a perspective view of the second embodiment of a battery cooler support architecture in accordance with the specification.

FIGS. 10 and 11 disclose a first embodiment of the battery cooler support architecture 100 in accordance with a first embodiment disclosed herein. The battery cooler support architecture 100 is has a frame 102, a battery cooler 108 and support beam 110 to provide support to the battery modules 4 and help reduce the stress on the battery cooler 108.

The frame 102 used in the battery cooler support architecture 100 is not particularly limited, and should be known to a person of skill in the art. In the embodiment disclosed, the frame 102 is provided with a pair of parallel upstanding walls 104, each having a ledge 106 extending towards the opposed wall 104. This leads to a gap between the ledge 106 on one wall 104 and the other ledge 106 on the opposed parallel wall 104, where the battery module is unsupported. The ledge 106 provides a surface for placement of the battery cooler 108 and can also be provided with means, such as, for example and without limitation, apertures or weld studs, for engaging with appropriate features in the battery cooler 108 to retain the battery cooler 108 in position on the frame 102. The means for positioning and retaining the position of the battery cooler 108 is not particularly limited, and should be known to a person of skill in the art.

The battery cooler (or heat exchanger) 108 disclosed herein is not particularly limited and should be known to a person of skill in the art. Non-examples of battery coolers 108 are disclosed in PCT International Patent Publication Numbers WO 2016168932, WO 2012055044, WO 2016109881, and WO 2016015156, and incorporated herein by reference.

The battery cooler 108 is formed by a pair of plates 112 that together define a fluid passage 114 for flow of a coolant fluid for heat exchange with the battery modules 4. The battery cooler is also provided with an inlet 116 and outlet 118 for entry and exit of the coolant flow from within the battery cooler passage 114. Although, the inlet 116 and outlet 118 are shown to be present on the same plate 112 of the heat exchanger 108, as should be known to a person of skill in the art, one of the plates 112 can be provided with the inlet 116 and the other of the pair of plates 112 can be provided with the outlet 118. Alternatively, the inlet 116 and outlet 118 can be formed along an edge of the battery cooler 108 by aligning the pair of plates 112.

Figure 1:
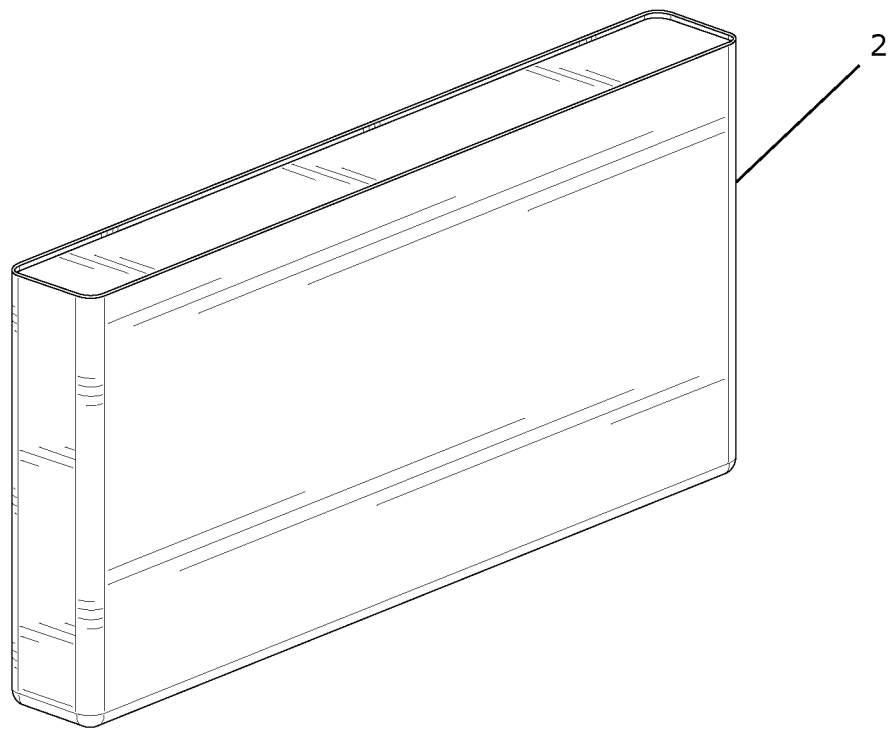
FIG. 1 is a schematic perspective view of a typical battery cell.
Figure 2:
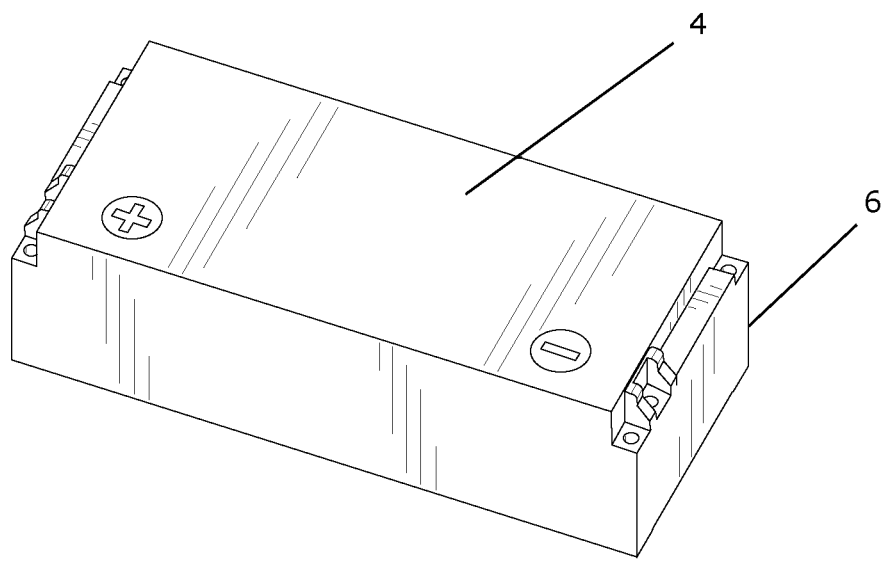
FIG. 2 is a schematic perspective view of a typical battery module.
Figure 3:
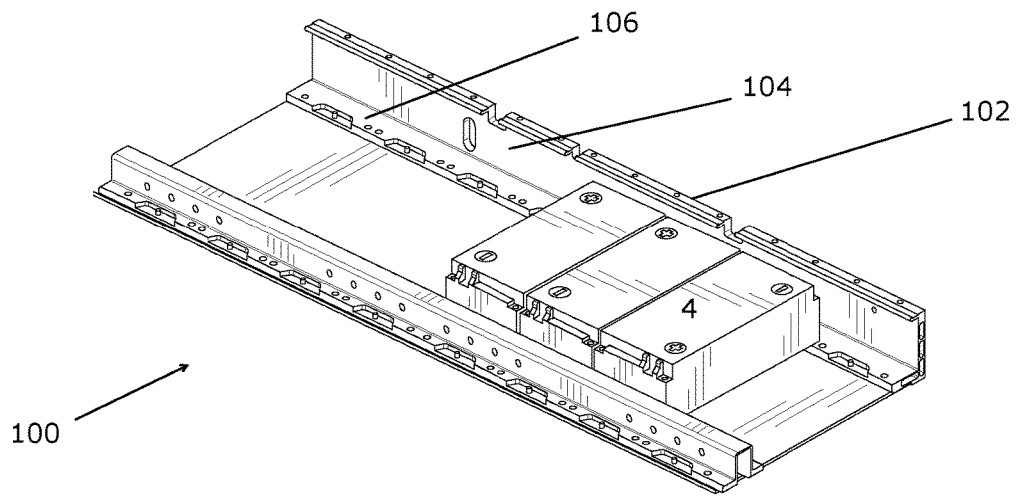
FIG. 3 is schematic perspective view of a typical battery architecture.
Figure 4:
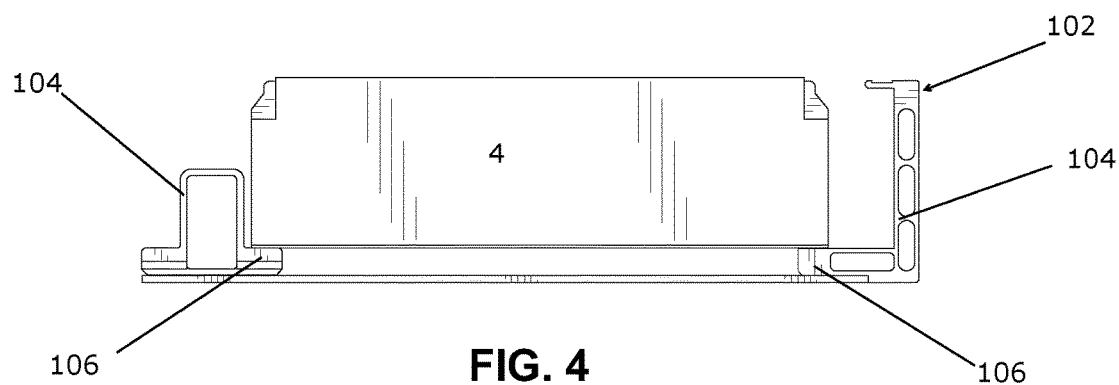
FIG. 4 is a schematic plan view of a typical battery module mounting.
Figure 5:
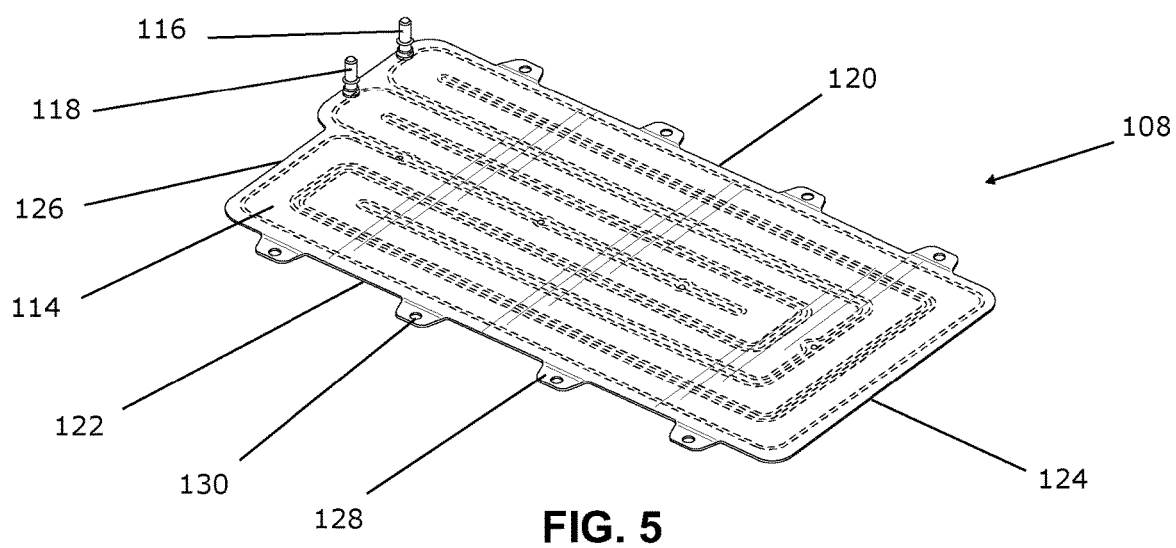
FIG. 5 is a perspective view of a typical battery cooler.
Figure 6:
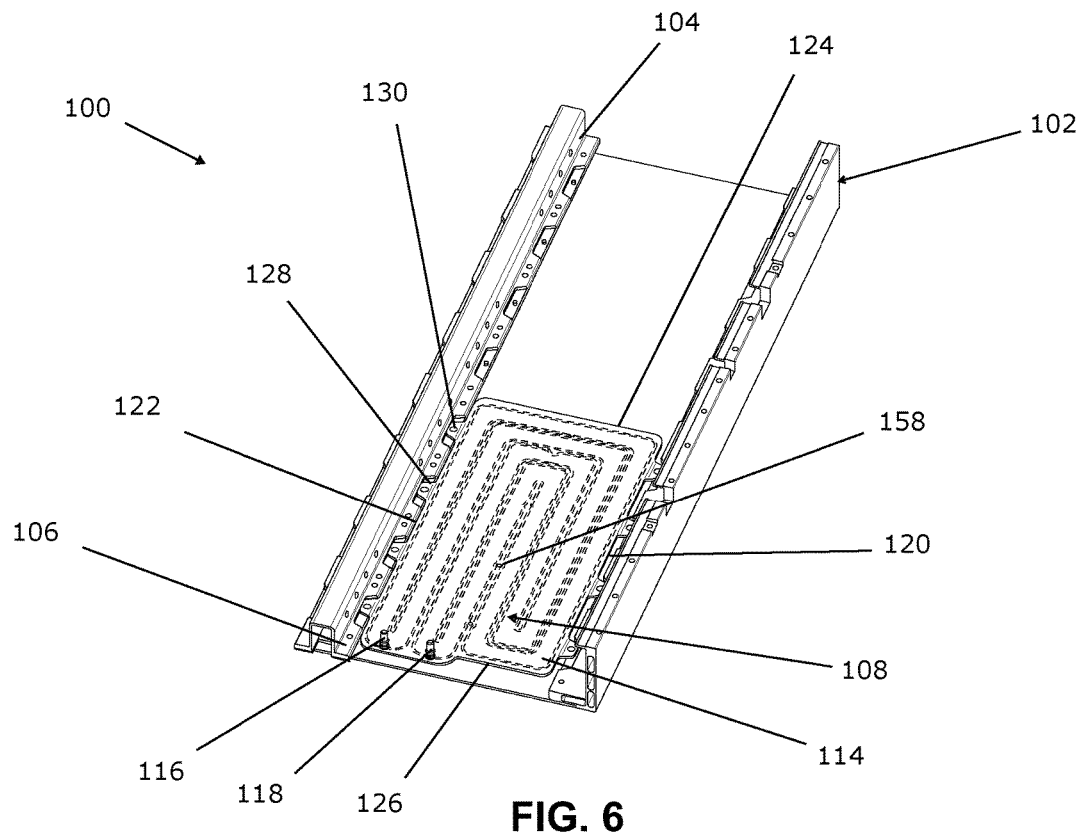
FIG. 6 is a schematic perspective view of a typical battery cooler support.
Figure 7:
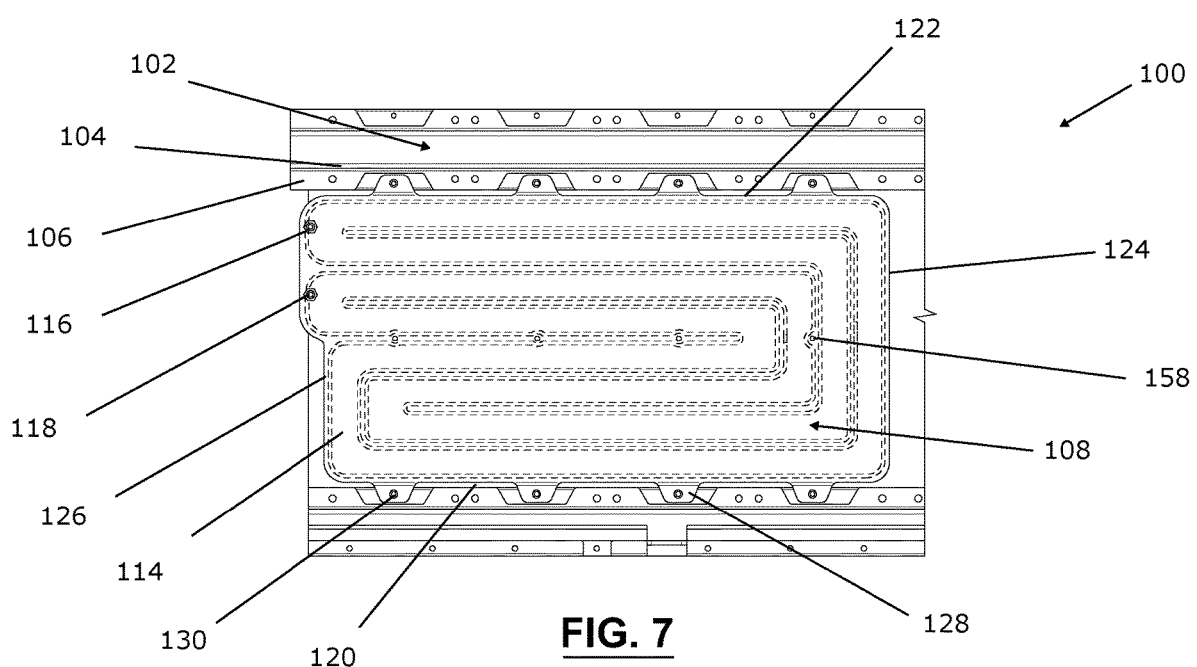
FIG. 7 is a top plan view of a typical battery cooler support.

In the embodiment disclosed, the heat exchanger 108 is rectangular in shape having a first edge 120 opposed to a parallel second edge 122. The first edge 120 and the second edge 122 form the longitudinal edge of the battery cooler 108 extending from the third edge 124 to the fourth edge 126 of the battery cooler 108. As shown in FIGS. 5 and 6, the battery cooler 108 is provided with protrusions 128 extending laterally from the first and second edges 120, 122 of the battery cooler 108. The protrusions 128 generally lie in the plane of the battery cooler 108, and can be provided with features, such as, for example and without limitation, a hole 130 for receiving a weld stud (not shown) extending from the ledge 106 of the frame 102 for positioning and retaining the battery cooler 108 in place.

As noted above, the battery cooler support architecture 100 is also provided with a support structure 110 that extends from one ledge 106 on one of the upstanding walls 104 of the frame 102 to an opposed ledge 106 of the other upstanding wall 104. The support structure 110 can be positioned either above the battery cooler 108, as shown in FIGS. 10 and 11, or below the battery cooler 108, as shown in FIGS. 12-15 and 20-22.

In the embodiment shown in FIGS. 10 and 11, the support structure 110 is formed by a railing-type structure having an arched beam 138 and a base 132 with opposed first and second ends (134, 136); with the first end 134 and the second end 136 of the base 132 being positioned on the ledge 106 of the frame 102. The arched beam 138 is generally semi-circular in shape and extends from the first end 134 to the second end 136 of the base 132. A plurality of studs 140 extend from the base 132 to the arched beam 138 to provide structural integrity to the arched support structure, while helping to minimize weight impact of the supporting structure 110.

The support structure 110 is also provided with a footing 142 extending from the base 132 of the railing. The footing 142 is planar and extends laterally outwardly from the base 132 of the railing. The length of the footing 142 is not particularly limited, and in one embodiment (as shown in FIGS. 10 and 11), for example and without limitation, the footing 142 extends from the first edge 120 of the battery cooler 108 to the second edge 122 of the battery cooler 108. The width of the footing 142 is also not particularly limited, and can be varied depending upon design and application requirements, so long as the footing 142 is rigid enough to help avoid or reduce deflection of the battery cooler 108 due to the weight of the battery module 4, as described herein.

In the embodiment shown in FIGS. 10 and 11, each support structure 110 is provided with at least one footing 142. In particular, the support structure 110 present near the third or fourth edges (124, 126) of the battery cooler 108, one footing 142 is provided, which extends towards the fluid passage 114 of the battery cooler 108. In other words, for the support structure 110 present near the third edge 124 of the battery cooler 108, the footing 142 extends from the side of the base 132 proximate to the fluid passage towards the fourth edge 126 of the battery cooler 108. In addition, for support structure 110 positioned in between the third and fourth edges (124, 126) of the battery cooler 108, a pair of footings 142 are provided, with one of the footings 142 extending towards the third edge 124 of the battery cooler 108 and the other footing 142 extending towards the fourth edge 126 of the battery cooler 108.

The battery module 4 is positioned between a pair of support structures 110 and sits on the footing 142 of the support structure. This can help to reduce the stress on the battery cooler 108, and can help to avoid deflection of the battery cooler 108. Hence, the footing should be sufficiently rigid to help reduce the stress on the battery cooler 108. Thermal interface material (TIM) (not shown) is positioned between battery module 4 and the battery cooler 108, and also between a pair of support structures 110 to help maintain battery cooler 108 temperature by heat exchange between the battery cooler 108 and the battery module 4.

The first embodiment (FIGS. 10 and 11) also involves establishing a mechanical connection between the battery cooler 108 and the module side rails. In accordance with the specification, methods of physical connection between the cooler and the side rails can vary, and can range from adding simple threaded weld studs added to the battery module side rails, to features formed onto the module side rails and cooler which permit fixation by sliding the cooler onto the module support rail. In one configuration, the module side rail is a beam structure to further reduce its mass over the solid rectangular parts in current use, FIG. 11.

Figure 16:
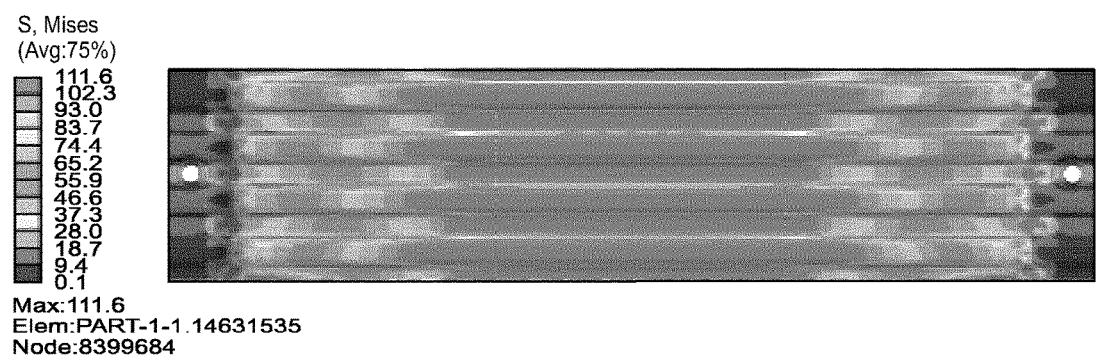
FIG. 16 shows stress on a horizontal end mounted battery cooler support beam of the second embodiment.
Figure 17:
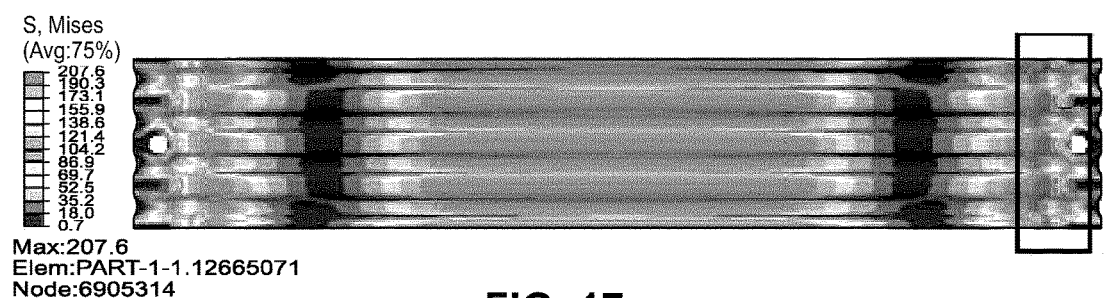
FIG. 17 shows stress on a co-angular end mounted battery cooler support beam of the second embodiment.

The second embodiment (FIGS. 12-15 and 20-22) of the cooler support architecture 100 disclosed herein involves a support structure 110 that has a beam design, and that can generate a uniform TIM surface pressure loading when fully deflected under the cooler 108 at module assembly. To achieve this, the beam 144 has a unique curvature shape in combination with beam end 146 support shape, FIG. 12. The beam flexural cross section is corrugated to generate a basis flexural strength for the desired TIM loading and beam span dimensions. The beam 144 section can be generally stamped from sheet material of uniform thickness. The large central arch 148 is iteratively selected so as to generate a uniform TIM surface loading whilst placing the beam material under relatively constant stress in this central arch 148 region FIGS. 16 and 17.

Figure 15:
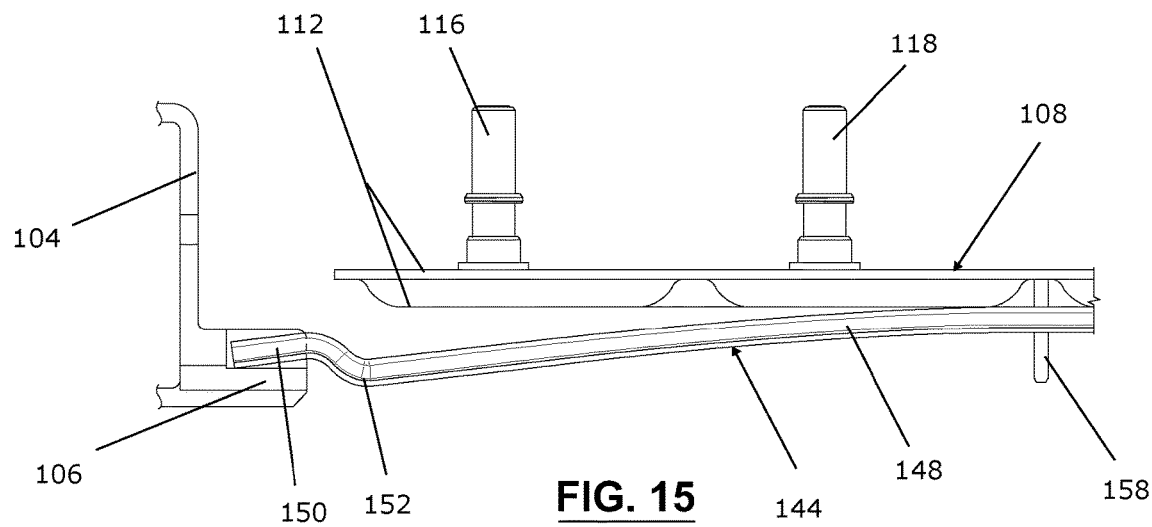
FIG. 15 shows a partial sectional plan view of the second embodiment of a battery cooler support architecture in accordance with the specification.

Stresses at the ends of the beam 144 where it is mounted to rails in the battery can rise significantly, if the ends do not move in an angular fashion similarly to the angular deflection of the ends of the large central beam arch 148. Generally the peak stress in the beam 144 is at the rail edge where the beam 144 begins to span between the rails. Reduction of this peak stress of from 400 MPa to 200 MPa is achieved when the beam ends 146 are pre-bent on nearly the same angle as the ends of the beam central arch 148. Referring to FIG. 15 that the beam deflects during battery assembly so that the arch becomes flat plane, so the cooler 108 is sandwiched between the beam 144 and the module 4 which mates to the rails. In this flattened condition the beam 144 exerts sufficient force to the cooler 108 underside so that the TIM layer experiences a largely uniform compressive pressure.

Figure 14:
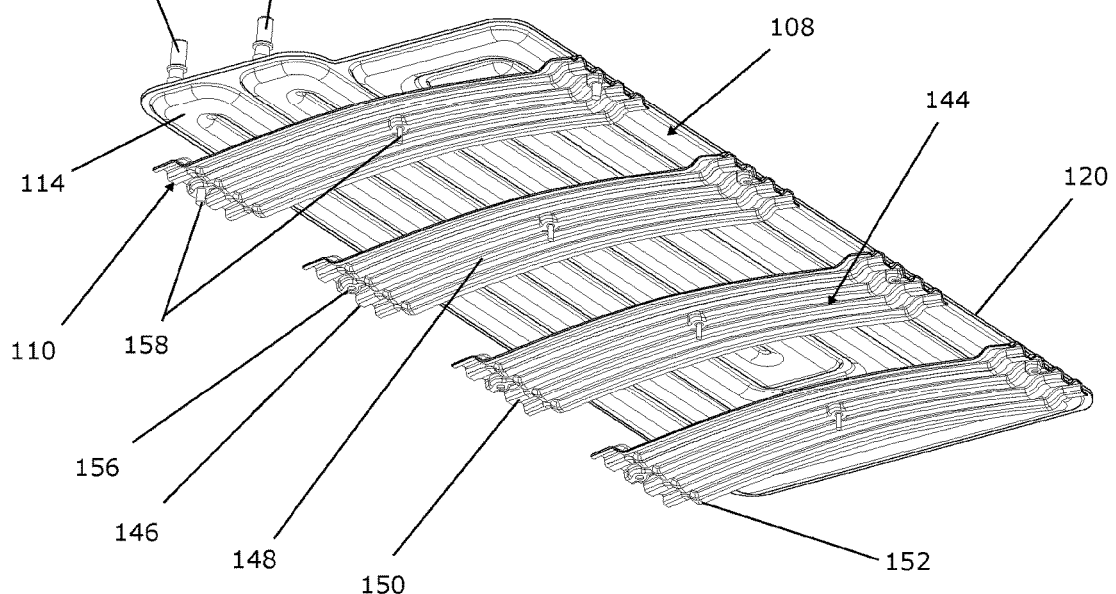
FIG. 14 shows a bottom perspective view of the second embodiment of a battery cooler support architecture in accordance with the specification.

In many cases, the cooler 108 and beam 144 nor their mounting locations are visible nor accessible during the final assembly operation which is to assemble the module 4. In this case it is desirable to have the cooler 108 and beams 144 pre-assembled and mounted to the battery enclosure rails 106 prior to module assembly. In such a case, a central fixation point at the beam 144 mid span is created sufficient to hold the cooler 108 and its beam(s) 144 together and in relative position for alignment to the beam mounting locations for proper assembly in a one step operation. FIG. 14 illustrates a case wherein a single cooler spans underneath four modules and thus requires it be pre-installed with four beams during assembly.

Figure 18:
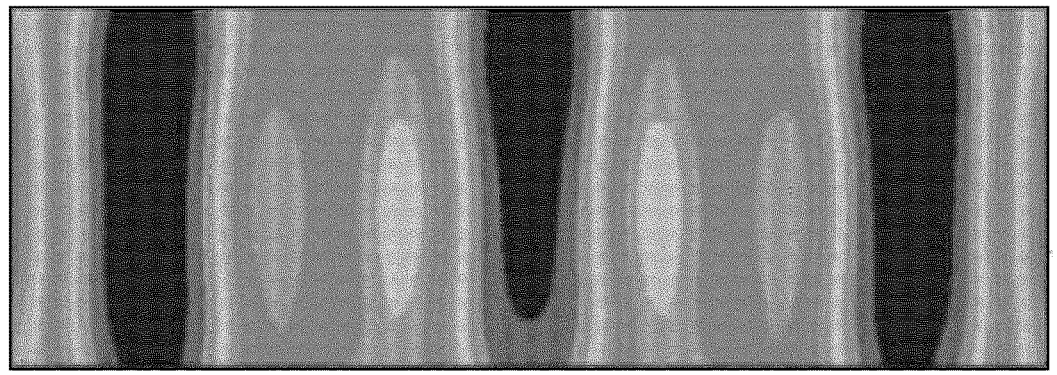
FIG. 18 shows the battery cooler beam contact pressure on a thermal interface material (TIM)
Figure 19:
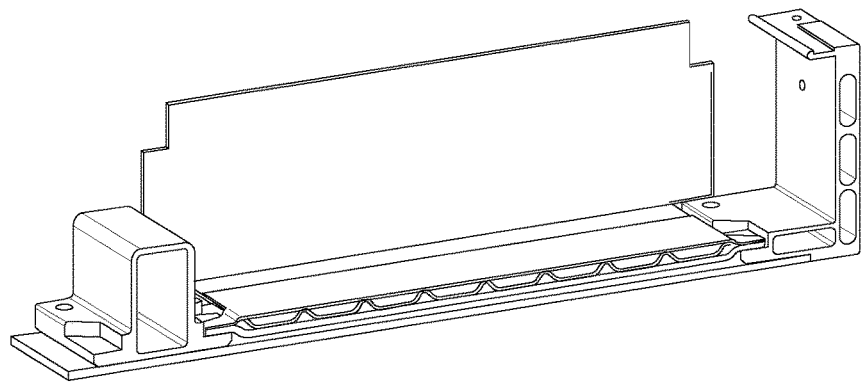
FIG. 19 shows the battery cooler module-beam contact pressure.
Figure 19:
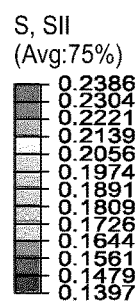
Figure 19:
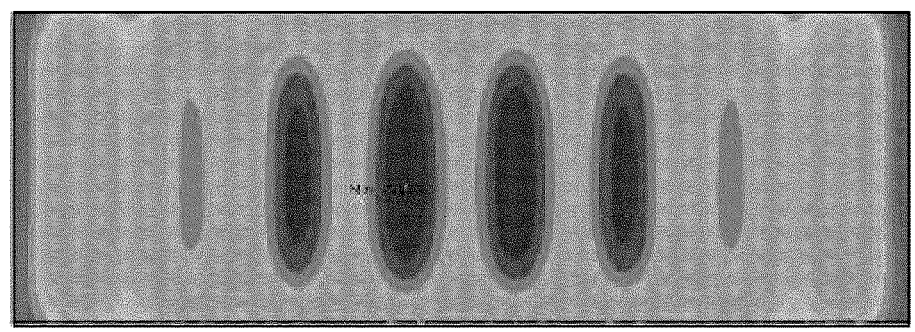

FIG. 18 illustrates that acceptable values of TIM pressure and pressure uniformity are achieved with this novel support beam, whereas FIG. 19 illustrates the same when the cooler 108 is fixed to the module side rails.

FIGS. 12-15 and 20-22 disclose a second embodiment of a battery cooler support architecture 100. The battery cooler support architecture 100 of the second embodiment, similar to the first embodiment, has a battery cooler 108 and a frame 102, with the frame 102 having a wall 104 and ledge 106, as described above with respect to the first embodiment (FIGS. 10 and 11), and the reader is referred to the other parts of the disclosure for understanding those parts of the battery cooler support architecture 100. However, in the second embodiment, the cooler support structure 110 is positioned between battery cooler 108 and the ledges 106 of the frame 102. Therefore, the battery cooler 108 and the ledges 106 of the wall 104 (part of frame 102) sandwich the support structure 110.

The support structure 110 in the second embodiment is a beam 144 extending from one ledge 106 of the frame 102 to the opposing ledge 106 of the frame 102. The beam 144 has a centrally arched beam section 148 extending from a planar surface 150 near the ends 146 of the beam 144. The convex face of the centrally arched beam section 148 contacts the battery cooler 108, with the planar surface 150 of the beam 144 being present near the ends 146 of the beam 144 for positioning over the ledge 106 of the frame 102. Therefore, prior to complete assembly of the battery cooler support architecture, the shape of the centrally arched beam section 148 results in the centre of the centrally arched beam section 148 being in contact with the battery cooler 108, while the other portion of the centrally arched beam section 148 moves away from the battery cooler 108 as it extends towards the ledges 106 of the frame 102.

A bend 152 is provided in the beam 144 between the planar surface 150 and the centrally arched beam section 148, which results in the curvature of the beam 144 near the planar surface 150 to be bent in a direction to extend towards the battery cooler 108. This results in the beam 144 having a generally W-shaped structure, when viewed from the side.

In one embodiment, as disclosed herein, the beam 144 has undulations, when the beam 144 is viewed from the side along its length. In other words, the beam 144 is provided with ribs 154 formed along the length of the beam 144, and hence has a corrugated cross-section. Such ribs help to further provide strength of the cooler support structure 100 (FIGS. 12-15 & 20-22).

Figure 20:
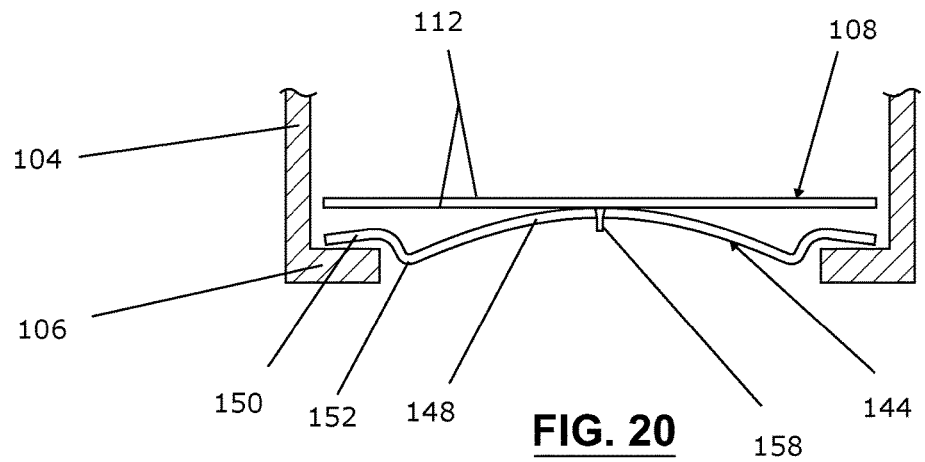
FIG. 20 shows a side cross-sectional view of the second embodiment of the battery cooler support architecture in accordance with the specification.

To ensure appropriate positioning of the beam 144 underneath the battery cooler 108, such that the beam 144 can provide adequate support to the module, in one embodiment, the beam 144 is provided with an opening 156 while the cooler 108 is provided with a protuberance 158 that can engage the opening 156 in the beam 144 (FIGS. 14, 15 and 20-22) to ensure appropriate positioning of the beam underneath the cooler. In one embodiment, as shown in FIGS. 14, 15 and 20, the opening 156 in the beam 144 is centrally positioned in the central arch section 148, with the protuberance 158 also being centrally positioned and extending from the battery cooler 108. The planar surface 150 of the beam 144 can rest on the ledges 106 of the battery pack support structure 100, and the entire assembly compressed downward during cell module assembly to the cold plate. The central arched of beam 148 acts to counteract deflection forces in the middle of the relatively less rigid cold plate, such that more uniform contact pressure is maintained between the cell modules 4 and the battery cooler 108.

In another embodiment, for example and without limitation, openings 156 can be formed in the planar surface 150 (FIGS. 12, 14, 21 and 22) for receiving a fastening means, such as, for example and without limitation, a weld stud or other protuberance 158.

Figure 21:
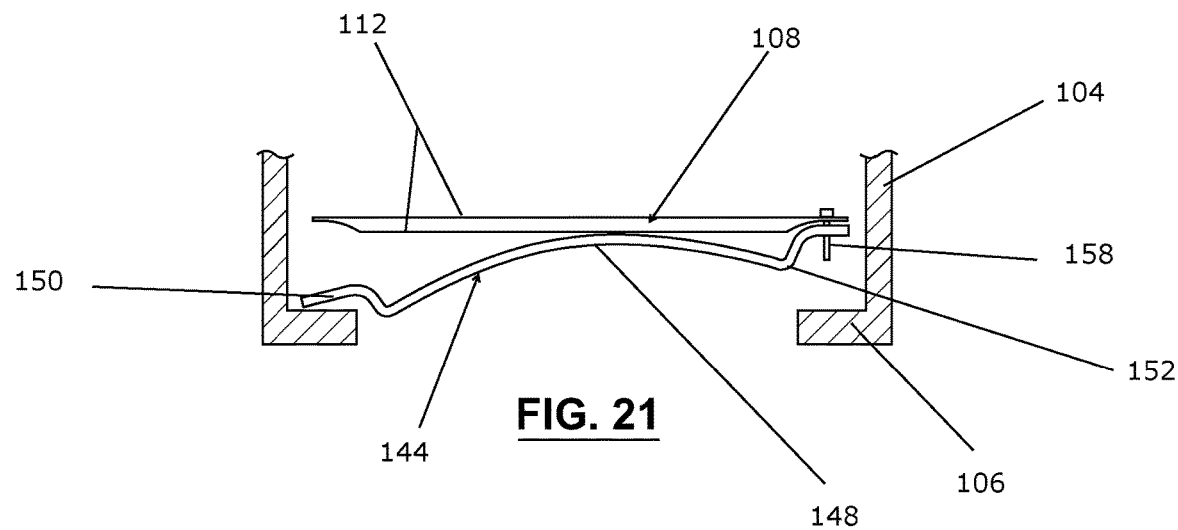
FIG. 21 shows another side cross-sectional view of the second embodiment of the battery cooler support architecture in accordance with the specification.

In such an embodiment, one end of the beam 144 can be coupled to the battery cooler 108 (FIG. 21). For instance, fastening means can be used that can engage the opening 156 at one end of the beam and also an end of the battery cooler 108, while the other end of the beam 144 remains uncoupled. Upon placement of beam-coupled-cooler on the frame, the free end of the beam 144 and battery cooler 108 can be coupled to affix in place and provide structural support to the battery cooler 108. During cell module assembly, the cold plate/beam assembly is compressed (as in the first embodiment described above); the curved beam 144 applies a counter pressure against the otherwise deflecting cold plate 108, to maintain more uniform cell module 4 to cold plate 108 contact pressure across the entire span of the cold plate 108.

Figure 22:
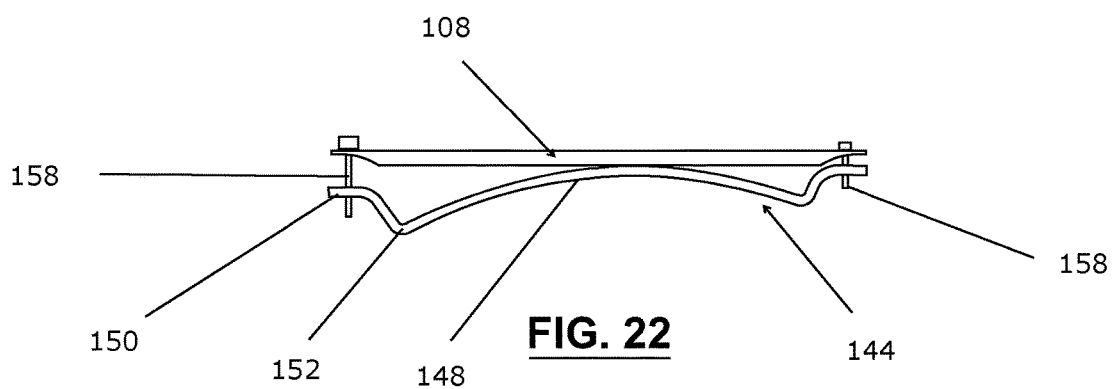
FIG. 22 shows a further side cross-sectional view of the second embodiment of the battery cooler support architecture in accordance with the specification.

In a further embodiment (FIG. 22), shown is a beam assembly that is pre-attached at both ends of the cold plate 108. Since fixed pre-attachments at either end require pre-compression of the assembly prior to cell module 4 installation, this can lead to deformation of the thinner less rigid cold plates 108, where the cold plate may plastically deform (curve) to degrade cell contact interface integrity in the later cell module assembly stage. To avoid this, as shown in the third embodiment, the beam assembly can have one or both ends free to slide vertically (FIG. 22 shows an embodiment with one free sliding end), to allow beam 144 compression to occur only during cell module 4 assembly, and so that the cold plate 108 remains flat.

In the embodiment where sliding pins are used at both ends, it is possible (depending on edge frame rail design) that the pin extension after compression will interfere with adjacent structures or mounting ledge. An optional way to resolve this would be to use breakaway pins that could extend either in the up or down direction initially, with the idea being to break off the excess pin length once sliding/cell module compression was accomplished.

In all embodiments, the beam 144 features to control are the curvature needed to maintain uniform contact pressure (proportional to beam span length), and the need to maintain parallelism between the outer lip and adjacent parallel curved end portion of the beam 144. The beam (or structural support) disclosed herein can have low profile/thin structure due to system space packaging constraints. Hence, in some embodiments, separate lightweight beams (or structural support) can be used rather than adding material thickness or standard stiffening ribs to the thickness of the cold plate. Moreover, the corrugated beam shape can further help to provide stiffness in direction perpendicular to the plane defined by the heat exchanger. As should be recognized by a person of ordinary skill, other shapes (rather than a corrugated beam) could conceivably work as well.

The beam is normally preferentially oriented across the shorter span in a rectangular cell pack, and in one embodiment, one beam 144 is located underneath each cell module 4. However alternate orientations and fewer numbers of beams may be used, depending on design trade-offs between degrees of cell contact uniformity needed, versus material or component cost. More complex beam shapes are also possible, to try and equalize forces using fewer beams. In one embodiment, for example and without limitation, hybrid arrangements are used, where underneath cold plate 108, beams 144 were used in conjunction with above cold plate stiffening rails or arches (combination of first and second embodiment). Such an embodiment can have utility in particularly long cell packs (cold plates).

In one embodiment, as disclosed herein, a single beam 144 helps to support the cooler 108 surface positioned underneath a single module 4. Hence, multiple beams 144 can be positioned underneath a single cooler 108, where each beam 144 is positioned underneath a module 4 to provide structural support to the cooler 108.

The cooler 108, as disclosed herein, is not particularly limited and should be known a person of ordinary skill in the art. The cooler 108 (or heat exchanger) in one embodiment is a battery cell cooler having two plates, that together define a fluid flow channel in between the plates. The plates of the cooler are also provided with an inlet and outlet that allow a fluid (coolant) to flow from the inlet to the fluid flow channel and exit from the cooler from the outlet.

Certain adaptations and modifications of the described embodiments can be made. Therefore, the above discussed embodiments are considered to be illustrative and not restrictive.

PARTS LIST

| No. | Description |
| --- | --- |
| 2 | Battery cell |
| 4 | Battery module |
| 6 | Battery module frame |
| 100 | Cooler support architecture |
| 102 | Frame |
| 104 | Wall of frame |
| 106 | Ledge |
| 108 | Heat exchanger (cooler/battery cooler) |
| 110 | Support structure |
| 112 | Cooler plate pair |
| 114 | Fluid passage |
| 116 | Cooler inlet |
| 118 | Cooler outlet |
| 120 | First edge of cooler |
| 122 | Second edge of cooler |
| 124 | Third edge of cooler |
| 126 | Fourth edge of cooler |
| 128 | Protrusions |
| 130 | Holes in protrusions |
| 132 | Base of support structure |
| 134 | First end of base |
| 136 | Second end of base |
| 138 | Arched beam |
| 140 | Studs in support structure |
| 142 | Footing |
| 144 | Beam |
| 146 | Beam end |
| 148 | Central arch of beam |
| 150 | Planar surface of beam |
| 152 | Bend in beam |
| 154 | Ribs |
| 156 | Opening in beam |
| 158 | Protuberance |

What is claimed is:

1. A battery cooler assembly, comprising:
a frame having a pair of opposed parallel walls, each of the walls having a ledge extending outwardly from one of the walls towards the other wall;
a heat exchanger positioned between the opposed parallel walls, the heat exchanger having a plate pair, the plate pair having a first plate and a second plate coupled to one another, the first plate and the second plate together defining a fluid flow channel permitting fluid flow from an inlet on the heat exchanger to an outlet on the heat exchanger; and
a plurality of arched support structures, wherein a central arched section of the plurality of arched support structures engages the heat exchanger, the plurality of arched support structures being positioned between the opposed parallel walls and extending from a first edge of the heat exchanger to a second edge of the heat exchanger,
wherein opposing top and bottom surfaces of the plurality of arched support structures are corrugated with ribs, a length of the ribs extending parallel to a length of the plurality of arched support structures and being formed into the central arch section of the plurality of arched support structures,
wherein the heat exchanger is relatively less rigid than the central arched section of the plurality of arched support structures that engages the heat exchanger, and
wherein the first edge of the heat exchanger is proximate to one of the opposed parallel walls and the second edge of the heat exchanger is proximate to the other opposed parallel wall, wherein the heat exchanger is positioned between one or more battery modules and the plurality of arched support structures, and opposing ends of each of the plurality of arched support structures are each positioned between the ledge of one of the opposing walls and the one or more battery modules, at least portions of the opposing ends of the plurality of arched support structures engaging the one or more battery modules thereby reducing stress on the heat exchanger.

2. The battery cooler assembly according to claim 1, wherein the one or more battery modules are positioned on the heat exchanger.

3. The battery cooler assembly according to claim 1, wherein the plurality of arched support structures are positioned between heat exchanger and the ledge of each of the opposed parallel walls.

4. The battery cooler assembly according to claim 3, wherein each of the plurality of arched support structures is a beam extending from one ledge of the frame to an opposing ledge of the frame.

5. The battery cooler assembly according to claim 4, wherein the ribs extend from the first end of the beam to the second end of the beam.

6. The battery cooler assembly according to claim 4, wherein the beam has an opening formed therein that receives a corresponding protuberance of the heat exchanger, the corresponding protuberance extending from the heat exchanger and through the opening.

7. The battery cooler assembly according to claim 6, wherein the opening is formed centrally in the central arch section of the beam, the opening formed into a surface of the beam that engages the heat exchanger and faces towards the heat exchanger.

8. The battery cooler assembly according to claim 4, wherein the one or more battery modules are aligned with longitudinal edges of the beam.

9. The battery cooler assembly according to claim 4, the beam of each of the plurality of arched support structures comprises:
   a centrally arched beam section extending from a first planar surface proximate a first end of the beam to a second planar surface proximate a second end of the beam, wherein a convex face of the centrally arched beam section contacts the heat exchanger and the first planar surface is positioned on one ledge of the frame and the second planar surface is positioned on an opposing ledge of the frame.

10. The battery cooler assembly according to claim 9, wherein the beam further comprises a first bend between the first planar surface and the centrally arched beam section, and a second bend between the second planar surface and the centrally arched beam section; the first bend and the second bend resulting the curvature of the beam near the first planar surface and second planar surface being directed to the heat exchanger.

11. The battery cooler assembly according to claim 10, wherein the beam has a generally W-shaped structure.

12. The battery cooler assembly of claim 1, wherein the heat exchanger is a battery cooler that deflects more than 100 microns under a 0.2 to 2 MPa range of pressure.

\* \* \* \* \*